US009165478B2

(12) United States Patent
Carro et al.

(10) Patent No.: US 9,165,478 B2
(45) Date of Patent: Oct. 20, 2015

(54) SYSTEM AND METHOD TO ENABLE BLIND PEOPLE TO HAVE ACCESS TO INFORMATION PRINTED ON A PHYSICAL DOCUMENT

(75) Inventors: Fernando Incertis Carro, Valencia (ES); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 3629 days.

(21) Appl. No.: 10/826,810

(22) Filed: Apr. 15, 2004

(65) Prior Publication Data
US 2005/0022108 A1 Jan. 27, 2005

(30) Foreign Application Priority Data

Apr. 18, 2003 (EP) .................................... 03368035

(51) Int. Cl.
*G06F 3/048* (2013.01)
*G09B 21/00* (2006.01)
*G06F 3/0481* (2013.01)
*G06F 3/01* (2006.01)
*G06F 3/0488* (2013.01)
*G06F 3/0484* (2013.01)

(52) U.S. Cl.
CPC ............ *G09B 21/001* (2013.01); *G06F 3/0481* (2013.01); *G06F 3/016* (2013.01); *G06F 3/04842* (2013.01); *G06F 3/04886* (2013.01)

(58) Field of Classification Search
CPC ... G06F 3/0481; G06F 3/04886; G06F 3/016; G06F 3/0488; G06F 3/04842
USPC .................................................. 715/702, 865
See application file for complete search history.

(56) References Cited

U.S. PATENT DOCUMENTS

| | | | |
|---|---|---|---|
| 4,644,339 | A | 2/1987 | Ruder |
| 4,996,707 | A | 2/1991 | O'Malley et al. |
| 5,223,828 | A | 6/1993 | McKiel, Jr. |
| 5,267,331 | A | 11/1993 | Siwoff |
| 5,287,102 | A | 2/1994 | McKiel, Jr. |
| 5,325,123 | A | 6/1994 | Bettinardi |
| 5,359,675 | A | 10/1994 | Siwoff |
| 5,374,924 | A | 12/1994 | McKiel, Jr. |

(Continued)

OTHER PUBLICATIONS

"Talking Books Speak Volumes", Kendra Mayfield, Wired News, Jul. 13, 2000, 4 pgs., http://www.wired.com/news/gizmos/0,1452,375,00.html.

(Continued)

*Primary Examiner* — Steven B. Theriault
(74) *Attorney, Agent, or Firm* — Schmeiser, Olsen & Watts, LLP; John Pivnichny

(57) ABSTRACT

A method and system for use in a user system, for accessing information related to a physical document. An electronic copy of an existing physical document is identified and located. The electronic copy of the physical document is an exact replica of the physical document. One or more pages of the physical document are identified. A selected part of the physical document is identified using the position of points on the identified one or more pages of the physical document and in response, data related to the selected part of the physical document is retrieved from the electronic copy of the physical document. The retrieved data is presented visually to a visually impaired person or orally to a blind person on the user system, which enables the visually impaired person to see or hear, respectively, the retrieved data.

26 Claims, 12 Drawing Sheets

(56) References Cited

U.S. PATENT DOCUMENTS

| | | | |
|---|---|---|---|
| 5,400,434 A | 3/1995 | Pearson | |
| 5,461,416 A | 10/1995 | Bettinardi | |
| 5,561,736 A | 10/1996 | Moore et al. | |
| 5,586,196 A * | 12/1996 | Sussman | 382/114 |
| 5,617,507 A | 4/1997 | Lee et al. | |
| 5,630,060 A | 5/1997 | Tang et al. | |
| 5,633,674 A * | 5/1997 | Trulaske et al. | 348/63 |
| 5,634,084 A | 5/1997 | Malsheen et al. | |
| 5,686,960 A | 11/1997 | Sussman et al. | |
| 5,694,256 A | 12/1997 | Winkler | |
| 5,715,412 A | 2/1998 | Aritsuka et al. | |
| 5,841,979 A | 11/1998 | Schulhof et al. | |
| 5,900,908 A | 5/1999 | Kirkland | |
| 5,960,448 A * | 9/1999 | Reichek et al. | 715/236 |
| 6,018,710 A | 1/2000 | Wynblatt et al. | |
| 6,084,556 A | 7/2000 | Zwern | |
| 6,085,161 A | 7/2000 | MacKenty et al. | |
| 6,088,675 A * | 7/2000 | MacKenty et al. | 704/270 |
| 6,115,482 A * | 9/2000 | Sears et al. | 382/114 |
| 6,127,990 A | 10/2000 | Zwern | |
| 6,184,847 B1 | 2/2001 | Fateh et al. | |
| 6,289,304 B1 | 9/2001 | Grefenstette | |
| 6,308,151 B1 | 10/2001 | Smith | |
| 6,324,511 B1 * | 11/2001 | Kiraly et al. | 704/260 |
| 6,731,315 B1 * | 5/2004 | Ma et al. | 715/856 |
| 6,731,326 B1 * | 5/2004 | Bettinardi | 348/63 |
| 6,823,184 B1 * | 11/2004 | Nelson | 455/418 |
| 6,940,491 B2 | 9/2005 | Carro | |
| 6,980,202 B2 * | 12/2005 | Carro | 345/173 |
| 7,000,189 B2 * | 2/2006 | Dutta et al. | 715/727 |
| 7,013,279 B1 * | 3/2006 | Nelson | 704/270 |
| 7,027,038 B2 * | 4/2006 | Carro | 345/173 |
| 7,181,692 B2 * | 2/2007 | Siegel | 715/727 |
| 7,194,411 B2 * | 3/2007 | Slotznick et al. | 704/271 |
| 7,212,318 B2 * | 5/2007 | Bradbery | 358/474 |
| 7,472,338 B2 | 12/2008 | Carro | |
| 7,473,670 B2 * | 1/2009 | Takahashi et al. | 505/470 |
| 2001/0056439 A1 * | 12/2001 | Carro | 707/500.1 |
| 2002/0047870 A1 | 4/2002 | Carro | |
| 2002/0069240 A1 * | 6/2002 | Berk | 709/203 |
| 2002/0087598 A1 * | 7/2002 | Carro | 707/513 |
| 2002/0101447 A1 * | 8/2002 | Carro | 345/760 |
| 2002/0152236 A1 * | 10/2002 | Incertis-Carro | 707/501.1 |
| 2002/0156866 A1 * | 10/2002 | Schneider | 709/218 |
| 2003/0117378 A1 * | 6/2003 | Carro | 345/173 |
| 2003/0117379 A1 * | 6/2003 | Carro | 345/173 |
| 2003/0191852 A1 * | 10/2003 | Incertis | 709/232 |
| 2004/0021648 A1 * | 2/2004 | Blume | 345/179 |
| 2004/0091842 A1 * | 5/2004 | Carro | 434/112 |
| 2005/0028092 A1 * | 2/2005 | Carro | 715/526 |
| 2006/0098899 A1 * | 5/2006 | King et al. | 382/305 |

OTHER PUBLICATIONS

"Paper is Still With us", Philippa Jane Benson, The Journal of Electronic Publishing, University of Michigan Press, 7 pgs., http://www.press.umich.edu/jep/07-02/benson0702.htm.

"Electronic Journals: What Do Users Think of Them?", Dr. Cliff McKnight, Department of information and Library Studies, Loughborough University, Loughborough, Leics LE11 3TU, UK, 7 pgs., http:scholar.google.com/scholar?q=casch:edXCCig2FZQJ:www.dl.ulis.ac.jp/ISDL97/pro . . . .

"A Comparison of Reading Paper and On-Line Documents".

"Children with Visual Impairment and their Reading: A Comparison Between Reading From Paper and Computer Screen", E. Kellami, G. Douglas, R. Long, School of Education, University of Birmingham.

"Fourteen Users in Search of a Newspaper: The Effect of Expectation on Online Behaviour", Ann Light, School of Cognitive and Computing Sciences, University of Sussex, CSRP 507.

"The Integration of Low Vision Aids and Other Assistive Devices in Educational and Vocational Settings", Matthew H. ATer, krista M. Davis, O.D., Columbia Lighthouse for the Blind, Washington, DC.

Bell Labs Projects. Multilingual Text-to-Speech Systems, 3 pgs., http://www.bell-labs.com/project/tts/index.html.

Bell Labs Spanish Text-to-Speech Systems, 1 pg., http://www.bell-labs.com/project/tts/spanish.html.

IBM TDB; Light pen to use with a transparent electro-luminiscent display; IP.com No.: IPCOM000016405D; Original Publication Date Nov. 30, 2002; IP.com Electronic Publication Jun. 21, 2003; 3 Pages. http://www.ip.com/pubview/IPCOM000016405D.

Patent application for Application No. 14/696,815, filed Apr. 27, 2015.

* cited by examiner

SYSTEM AND METHOD TO ENABLE BLIND PEOPLE TO HAVE ACCESS TO INFORMATION PRINTED ON A PHYSICAL DOCUMENT

FIELD OF THE INVENTION

The present invention generally relates to a system and method for enabling blind and visually impaired people to interact with a physical document and to have access to information printed on a physical document.

BACKGROUND OF THE INVENTION

Accessibility

In broad terms, accessibility is the ability for a user to access and use information and technology even if this user operates in constrained conditions. Information and technology can be accessible through appropriate specialized technical interfaces. The present invention is directed to a technology to enable visually impaired and blind people to access information printed on physical documents.

Many groups, in governments, private industries and universities, are working on ways to guarantee universal access to the on-line world for all individuals in society. This social movement, combined with a strong push to provide a better accessibility in the workplace, drives an urgent call for new technologies.

As information technology (IT) penetrates all commercial and public transactions and communications, it is important to ensure accessibility to everyone. Governments have begun to define new regulations and standards to enable people with disabilities to easily access information technology. For instance, in the US, the federal, state and local governments have initiated a legislation requiring computer technology to be accessible to people with disabilities. More particularly, in June 2001, the U.S. Federal Government has implemented a legislation known as "Section 508". Section 508 has changed the rules of the game on how the government must buy information technology and in particular "accessible" IT.

Countries have established regulations that require accessibility at some level, other countries are in the process of developing such regulations. In addition, international organizations are working to develop accessibility standards.

Accessibility Aids for Blind People

For someone who is completely unable to use a normal screen or read a printed text, there are two alternatives: Braille reading or speech. Currently available assistance for blind and visually impaired people comprises a wide range of technical solutions, including document scanners and enlargers, interactive speech software and cognitive tools, screen reader software and screen enlargement programs.

Screen Readers: This technology converts text (or other elements) on a computer screen to speech, allowing blind or visually impaired users to hear what is displayed on their computer screen. For example, "Jaws for Windows" is a computer screen-reader application from Henter-Joyce. It operates with Windows NT 4.0, Windows 98 and Windows 95 and includes an enhanced software speech synthesizer for speaking in several languages.

Note: Windows is a trademark of Microsoft Corporation, a company with corporate headquarters in Redmond, Wash., USA.

Web Page Readers: This technology reads aloud text just as it appears on Web pages. For example, "Home Page Reader" of IBM, understands HTML (Hypertext Markup Language), the programming language used to design Web pages. Home Page Reader can accurately read text comprised in tables, or included in graphic descriptions, so that blind users can easily navigate on the Web.

Note: IBM is a trademark of International Business Machines Corporation, a company with corporate headquarters in Armonk, N.Y., USA.

Mail Readers: This technology uses a screen reader for converting the text of an e-mail to speech. For example, "Lotus Notes Release 5" of IBM, enables blind users to check the status of their e-mail (unread, read, deleted), to use calendar functions, and to file and organize documents.

Braille Editing Systems (BES): These systems allow users to input Braille characters from the keyboard. For instance, IBM provides a BES that can be downloaded from the IBM Web.

Scanning Reading Systems: The information printed on a physical document is first scanned. Then, using an OCR (Optical Character Recognition) technique and a speech synthesizer, this information can be read to blind people. For example, "Open Book: Ruby Edition 4.0" of IBM is a program that transforms a computer, a sound card, and a scanner into a reading machine for reading books, magazines, memos, bills, and many other printed documents.

Screen Magnifiers: These software tools allow a visually impaired user to magnify text and images on a computer screen. For example, "MAGic Screen Magnification", from Henter-Joyce, is a screen magnification product for Windows.

Portable document magnifiers: The MAXPort by Nano-Pac, Inc. is a portable magnifying system. The user wears a special pair of glasses, points at a particular part of a physical document and can see a magnified image of said particular part.

Access to Printed Material

Reading manuals and reports at work, textbooks at school, and menus at restaurants, and more generally reading printed material at any time and in any place is part of daily life. The present invention is based on the following observation: it is easier and quicker for sighted people to turn over pages of a book than to browse electronic pages on a computer screen. It would be an improvement to provide a similar capability to blind and visually impaired people. For instance, it would be a real improvement for blind people to have the possibility to access information printed on a physical document directly from this physical document.

When we compare paper based information with computer based information, paper has a number of useful properties that computers cannot provide. For instance:

paper is portable, familiar and can be easily distributed;
paper is easy to read, mark, and manipulate.

Many electronic systems attempt to replace paper. They offer, for instance, a better access to multimedia services. However, most users prefer to work with paper and it is difficult to foresee, in a near future, a general and massive replacement of paper books by electronic books (e.g., by Web accessible e-books).

Publication entitled "*The Last Book*", IBM Systems Journal, Vol 36, No. 3—1997, by J. Jacobson, B. Comiskey, C. Turner, J. Albert, and P. Tsao of the MIT Media Laboratory, compares printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

Publication entitled "*A Comparison of Reading Paper and On-Line Documents*", O'Hara and Sellen, XRCE: Technical Report: EPC-1997-101, Xerox Co. summarizes a study comparing reading from paper to reading on-line. As reported in this article:

"Critical differences have to do with the major advantages paper offers in supporting annotation while reading, quick navigation, and flexibility of spatial layout. These, in turn, allow readers to deepen their understanding of the text, extract a sense of its structure, create a plan for writing, cross-refer to other documents, and interleave reading and writing".

As reported in an article entitled "*Paper is still with us*", by Ph. Jane Benson—The Journal of Electronic Publishing, published by the University of Michigan Press—

"Studies of professionals at work underscore three points that are critical to the design of scientific information: paper isn't going away, reading and writing are inextricably intertwined, and readers sample and navigate text according to specific purposes and tasks".

Also, in the article entitled "*Electronic Journals: What do users think of them?*", by Dr Cliff McKnight, Department of Information and Library Studies, Loughborough University, Loughborough, Leicester LE11 3TU, UK, we can read:

"A paper journal article is more easily manipulated than an electronic version. As one student subject in the Cafe Jus study remarked: 'It is easier to turn the page of a paper journal'. More than just page-turning, though, regular journal readers understand the structure of journal articles and use that knowledge to aid manipulation, providing rapid access to the information in an article. For example, Dillon showed that people could reconstruct articles from a set of paragraphs with about 80% accuracy. They also displayed a similar level of accuracy in saying which section of an article isolated sentences had been taken from. Watching a reader pick up an issue of a journal, skim through the contents, turn to an article and skim through it and then turn back to the contents, all in a matter of seconds, it is clear that such skills are largely automatic. Watching people trying to do the same thing in an electronic journal system, it is clear that people will have to learn a different set of skills".

Sighted people can browse very easily through paper catalogs, magazines, newspapers, maps and books by flipping through the pages and by "glancing" at pictures and text. It is also very easy for them to mark and return to specific parts of a physical document. It would be desirable to offer similar possibilities to blind and visually impaired people and in particular to enable these people to easily browse through the same paper catalogs, magazines, newspapers, maps and books, and to easily "access" (receive and hear) information related to pictures and text printed on pages of these documents.

The convenience and usefulness of a system for enabling blind and visually impaired people to access information directly from hard-copy documents, to turn over pages and to manually search for text, is well illustrated by in the following article entitled "*Talking Books Speak Volumes*", by Kendra Mayfield, Wired News, Jul. 13, 2000, "When George Kerscher began to lose his sight in his late twenties, the former teacher realized that he might never be able to read the same way again. Since he could no longer delve through the written page Kerscher, who has the degenerative disease retinitis pigmentosa, began listening to audio books. But while these cassettes helped him read, they were limited. He couldn't turn pages or search for text. He had to endure hours of recordings to find the information he needed".

In fact audio tapes have a drawback which is similar to the drawback experienced when we scroll computer screens: the user can only go forward or backwards. The possibilities of navigation are very limited. It is difficult for people with visual impairments, to use audio books or screen readers the same way sighted people do. For instance, looking up a recipe or searching for a gardening tip on an audio tape or on a long electronic book is extremely tedious and time consuming.

Nowadays, digital audio books are designed to make published documents accessible and navigable for to blind or visually impaired persons. The ANSI/NISO Z39.86 standard, defines a format and content for an electronic file set that comprises a digital audio book and establishes a limited set of requirements for digital audio books playback devices. It uses established and new specifications to delineate the structure of digital audio books whose content can range from text with corresponding spoken audio, to audio with little or no text. However, if a sighted user of a physical book wishes to discuss a particular section of such this book with a blind user, the blind user must actively search for a digital copy of the same edition of the book and then must search for the relevant section. There is a need to enable individuals familiar with paper documents to continue to use those same documents as they age and their vision may be deteriorating. There is also a need to provide a mechanism by which the text of a familiar physical document may be supplemented by speech output or display of a more easily readable version of the text.

One of the characteristics of the publishing industry is that most publications can be delivered in a digital form. In some cases, the digital form has really supplanted the physical one. In other cases, the digital form appears complementary to the physical one. However, in most cases, the physical form is till dominant. In fact, in terms of business models, with the exception of journals and directories, which tend to follow a subscription model, most publishers have been unable to create profitable digital products and services, able to generate significant incomes. Digital audio books represent an important improvement compared to traditional analog audio books. For instance, digital audio books provide access to virtually stored information, offer improved navigation capabilities, allow the use of keywords for searching and directly accessing text in electronic books. However, due to a relatively limited number of vision impaired users, the cost of such digital audio books remains relatively high. It results from this that a very small number of titles are published both, as printed books and as digital audio books.

The necessity of using a natural friendly interface for having access to information has been precisely summarized by Ann Light, in the article entitled "*Fourteen Users in Search of a Newspaper: the Effect of Expectation on Online Behaviour*", School of Cognitive and Computing Sciences, University of Sussex, CSRP507, "People expect the friendly familiar paradigm of media to guide them through uncharted territories of information".

According to prior art, electronic reading machines using computer-based optical character recognition (OCR) are widely used to help visually impaired people and people with reading difficulties to read information on paper documents. An electronic reading machine basically comprises a personal computer connected to a scanner and operating with an OCR software, and text-to-speech hardware and software.

Usually, a method for electronically reading a printed document comprises the following steps:

placing a page of a text document on a scanner;

digitizing this page for obtaining a pixel bit map of the page;

converting this image to text by means of an OCR program executed in a personal computer, this personal computer being connected to the scanner; and generating speech from the text by means of a text-to-speech program.

Currently, reading machines are provided by a variety of companies, including IBM, Telesensory, Arkenstone and Kurzweil Educational Systems. Unfortunately, electronic reading machines suffer from a variety of functional and operational deficiencies that limit their usefulness. For instance:

scanning a page is a mechanical operation. It takes time to move the electro-optical components of the scanner over the page.

it takes time also to transmit the information from the scanner to the computer.

the OCR process for an entire scanned page, takes a lot of time and resources.

only a single page can be scanned at the same time.

OCR is prone to error. Prime Recognition, in an advertisement for the product PrimeOCR, quotes a typical error rate of 2% for conventional OCR algorithms. PrimeOCR itself reports an error rate of 0.4%, or 8 errors in a typical page of 2000 characters.

As a result, even for an experienced user, it can take more than a minute before an electronic reading machine can read a single scanned page. During of after the reading, errors must be corrected. The process is repeated for every page in the document.

Since scanners are limited in size, another drawback concerning electronic reading machines is the reading of pages with large formats (a newspaper page for instance). Such pages cannot be scanned in one pass but require multiple passes.

Moreover, a complete electronic reading system with a computer, a scanner, and speech hardware and software is bulky and non portable.

It is clear that reading a text on a paper document by means of an electronic reading machine involves complex manipulations and time consuming operations. However, there are other important deficiencies that limit in practice the acceptance and usefulness of electronic reading machines. Basically, the tasks required for using these electronic reading machines are far to be "natural". Reading physical documents by means of an electronic reading machine, has nothing in common with the automatic "natural" way of reading practiced by sighted people.

A mobile scanning pen comprising an optical character recognition function, can also be used for producing a digital version of a printed document. Wizcom's Quicklink Pen Personal Scanner is an example of such pen. However, scanning printed words using such a pen can be rapidly tedious and laborious. Each line must be individually (and accurately) scanned and a reasonable visual acuity is required. The present invention does not require a good vision, as only two physical markers are required to define the part of the document that must be read.

As a conclusion, it is important to enable blind people to easily and conveniently access information comprised in hard-copy publications that are read everyday by sighted people.

OBJECTS OF THE INVENTION

It is an object of the invention to enable a blind or visually impaired person, as well as a person with reading disabilities, to access information printed on a physical document and information related to this printed information.

It is another object of the invention to enable a blind or visually impaired person to access information directly from a physical document without using an electronic reading machine based on a page scanner and/or an optical character recognition (OCR).

It is another object of the invention to enable a blind or visually impaired person to easily select a part of a physical document simply by touching (e.g., with the fingertip or with a pen) this physical document.

It is a further object of the present invention to enable a blind or visually impaired person to take a physical document, to open it at any page, to select with a finger or a pen a part of this page and to hear the text of the selected part.

It is also an object of the present invention to enable both magnification and electronic reading of a selected part of a physical document.

It is a further object of the present invention to enable a person, after having selected a part of a printed document comprising text and images, to hear the text, to receive descriptions of images, and to access multimedia information or services related to said printed text and images.

It is a further object of the invention to provide a system that, apart from providing to a blind or visually impaired person, an access to information directly from a physical document, can also be used for many other applications in the daily life, such as helping children to read, enabling people with reading difficulties to read, enabling sighted people to read in the dark, enabling people with a poor vision to read small print on paper documents.

It is a further object of the present invention to enable individuals familiar with paper documents to continue to use the same documents as they age and their vision may be deteriorating and to supplement the text of a familiar physical document by speech output or display of a more easily readable version of the text.

SUMMARY OF THE INVENTION

As defined in independent claims, the invention relates generally to a method, a system and a computer program for enabling a blind or visually impaired person, to access information printed on a physical document, directly from said physical document, simply by pointing and touching a desired part of said document. More particularly, the method comprises the steps of:

identifying a physical document;

identifying and locating an electronic copy of said identified document;

identifying one or a plurality of pages of said physical document and identifying a part of the identified physical document using the position of points pressed on a touch foil successively placed and aligned over or under said identified pages;

retrieving from the electronic copy of the physical document, data related to the selected part of the document;

presenting said retrieved data visually or orally on the user workstation.

Further embodiments of the invention are provided in the appended dependent claims.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

Figure 1:
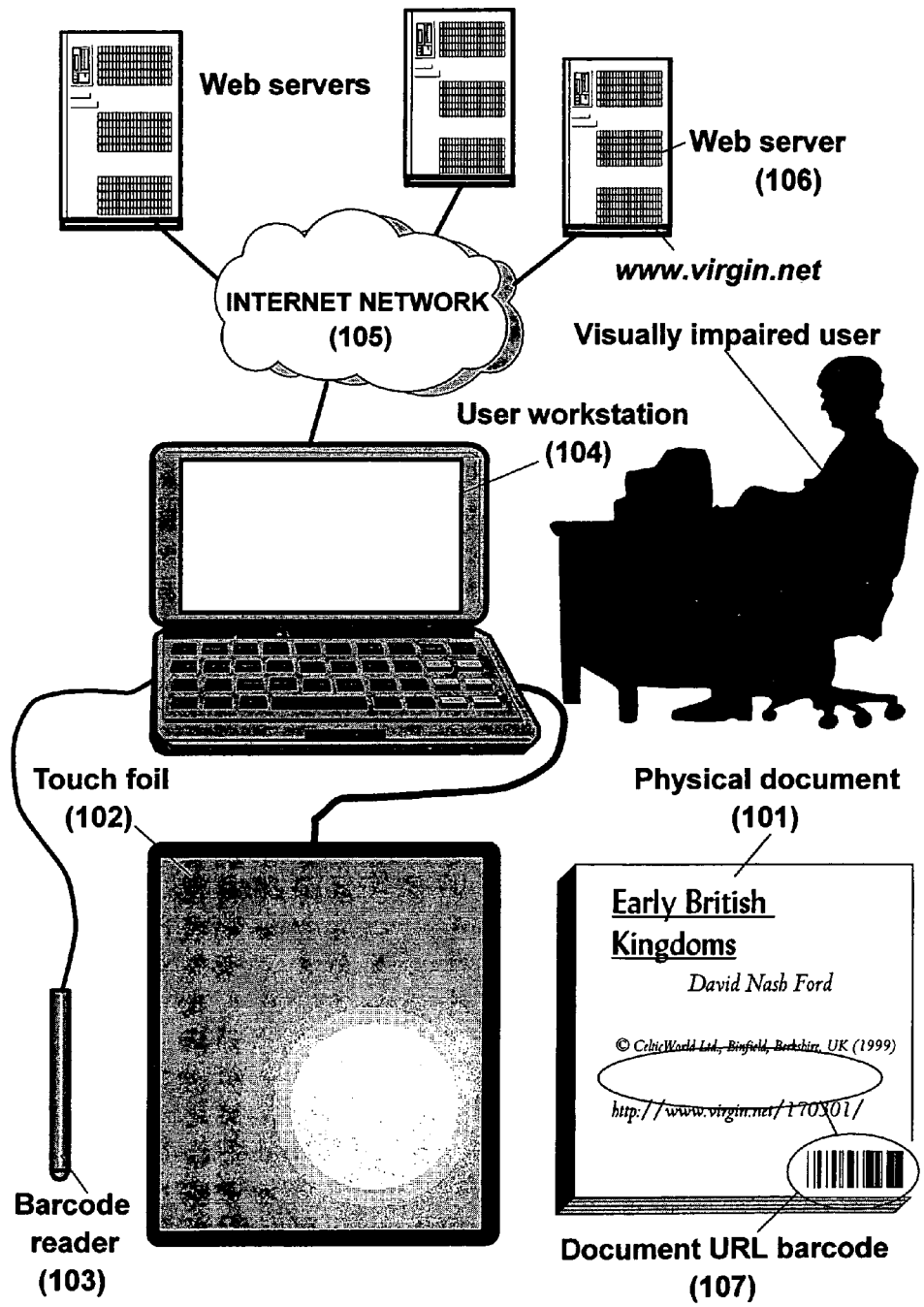
FIG. 1 shows a preferred embodiment of the present invention.

The invention itself, as well as a preferred mode of use, objects and advantages thereof, can be understood by reference to the following illustrative embodiment described by the accompanying drawings.

DETAILED DESCRIPTION OF THE PREFERRED EMBODIMENT

The present invention addresses different problems that may arise in reading text, particularly problems that affect visually impaired persons or persons who cannot see or read correctly (e.g., in low light conditions). For instance:

a person driving a vehicle may have some difficulties to read a text;

another person may not have time to read a text;

bad lighting or display conditions may make difficult or impossible the reading of a text in a printed or displayed form.

The present invention allows a blind reader to receive an audible transcription of a selected part of a physical document (for example an audible transcription of a selected text in book).

The present invention also discloses a method for selecting a part of a physical document simply by pressing with a fingertip or a pen a touch foil placed over said document; for identifying data associated with this selected part in a database comprising an electronic copy of the document; for extracting text from said data and for converting this text into speech.

The present invention is directed to a method for use in a user system connected to a network, for retrieving from a server, an electronic copy of a physical document, and information related to said document, and for playing, displaying, reading and/or magnifying on the screen of this user system, the retrieved electronic copy and information related to said document. The method comprises the steps of:

identifying a physical document selected by a user, preferably by reading, by means of a barcode reader, a document identifier printed on said physical document at a predefined position;

identifying a first page selected by the user in said physical document, preferably by reading, by means of a barcode reader, a page identifier printed on said first page at a predefined position;

determining the position of a first point pressed (e.g. with a fingertip or a pen) on a touch foil placed and aligned over or under the identified first page, said first point corresponding to the start point of a part selected in said identified document by the user;

if start point and end point of the selected part are on the same page:

determining the position of a second point pressed (e.g. with a fingertip or a pen) on the touch foil placed and aligned over or under the identified page of said document, said second point corresponding to the end point of said selected part;

if start point and end point are not on the same page:

identifying a second page selected by the user in said physical document, preferably by reading, by means of a barcode reader, a page identifier printed on said second page at a predefined position;

determining the position of a second point pressed (e.g. with a fingertip) on the touch foil placed and aligned over or under the identified second page of said document, said second point corresponding to the end point of said selected part;

identifying the part of the identified physical document that has been selected using the position (e.g. coordinates) of the start point and the end point;

identifying and locating an electronic copy of the identified document and information related to the selected part of the document;

retrieving from the electronic copy of the document, data related to the part of the document selected by the user;

extracting text data from said data and audibly reading said text data by means of a text-to-speech software;

optionally or alternatively, magnifying said retrieved data on the user system screen;

optionally or alternatively, accessing multimedia information or services related to said retrieved data.

Synthetic Reading and Screen Magnification of a Selected Part of a Physical Document As shown in FIG. 1, the system according to an embodiment of the present invention comprises:

- a physical, i.e., hard-copy document (101) (e.g., a book) comprising one or a plurality of pages;
- a physical document interface comprising a touch foil (102) (to be placed over or underneath a page of this document);
- a barcode reader (103);
- a user workstation (104), connected to
  - the touch foil interface (102);
  - the barcode reader (103);
  - a communication network (105) (e.g., the Internet network);
- a server (106) (e.g., a Web server).

Physical Document

Figure 3:
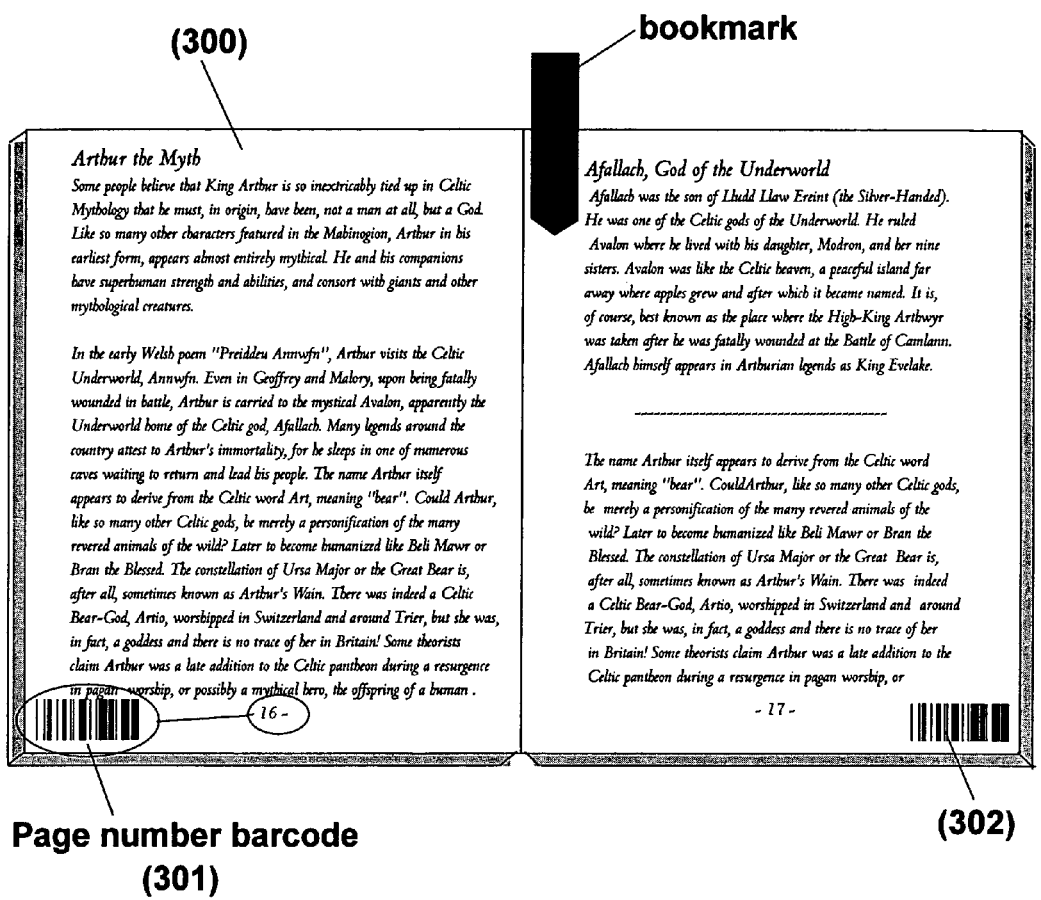
FIG. 3 shows how a user opens a physical document (e.g., at the page where a bookmark has been inserted).

The physical document (101) can be of any kind, for example, a newspaper, a legal document, a geographic map, a fiction novel, an academic text book, a technical book, a commercial catalog or even any other type of engraved, written, or printed surface. The material of the document can be paper, plastic, wood or any other material. For identifying the selected document (101) to the system, a bar code (107) is printed or attached at a well known position on the physical document (e.g., on the front cover, back cover or first page). In the embodiment of the invention shown in FIG. 1, the URL (i.e., the internet address) of an electronic document is encoded in a bar code (107). This electronic document stored on a server (106) is the copy of a physical document (101). As illustrated in FIG. 3, to identify pages in a document (300), (101) a bar code (301), (302) is printed or attached at a well known position on each document page (e.g., on the bottom left (301) and bottom right corners (302) of the open document (300)). Bar codes are read by means of a barcode reader (103) connected to the user workstation (104).

In an alternate embodiment of the invention, a physical document can be specifically produced for the purpose of accessing information from a tactile system. Compared to the original paper document, this physical document can have a different form, to include, for instance, tactile indications (in Braille, for example) related to the structure and pages of the document. With such a tactile document or book, a blind user can quickly and independently navigate in the document, and can easily mark the sections of text he wish to hear. In this embodiment, to select the same part of text, the server determines from the points selected by the user on the physical document, the corresponding points in the original paper document.

Touch Foil

The touch foil (102) may be made of transparent resistive or capacitive films of the type used commonly to manufacture touch screens. The generated signal is generally proportional to the coordinates of the point pressed. One example of touch foil it is possible to use is the TouchTek4 (4-wire Analog Resistive Touchscreens) of MICRO TOUCH company (TouchTek™ is a trademark of the MICRO TOUCH Company).

TouchTek4 touchscreens feature hard-coated polyester topsheets, available in several surface finishes. Spacer dots are available in several dot arrays, optimized for finger, pen and finger, or pen-only input. Electronic control is provided by a serial controller, or by 4-wire controllers. TouchTek4's specifications include narrow inactive border areas and compact touch sensors which allow system designers and OEMs to provide the largest useable screen area and full mouse emulation without sacrificing functionality or consuming excess power. Apart from being suited for implementing the functions of this invention, TouchTek4 touchscreens are commonly used in hand-held personal information management systems, PDAs, mobile computing systems, automotive, diagnostics and telecom devices, and Internet appliances. TouchTek4 touchscreens are engineered to accept more than three million touches to any area of the screen.

Barcode Reader

The barcode reader (103), connected to user workstation (104) is used to identify the documents and pages of the documents selected by the user. One example of barcode reader it is possible to use, is the PenWAND© ComputerWare. The PenWAND is a combination of barcode reader and light pen in one hand-held instrument. This is an ideal solution for applications requiring reading of barcodes and screen selection.

User Workstation

In the embodiment of the invention illustrated in FIG. 1, the user workstation (104) is used for carrying out the following steps:

- receiving from the barcode reader (103) a code for identifying (107) the document (101) (for instance, an address or an URL Uniform Resource Locator) and the page number (301) selected by the user;
- receiving from the touch foil (102), (602) the coordinates of the two points (605), (606) touched by the user over the document (601), said points (the start point and the end point) specifying the part of the selected document page that must be read;
- transmitting to a given server (106) means for identifying on said server an electronic copy (or replica, or representation) (900) of the physical document (101), (700) and data related to the part of the physical document (701), (702) selected by the user; said identification means comprising:
  - the document identification code (107),
  - the page identification code (301) and
  - the coordinates of the two points (605), (606) specifying the part (701), (702) of the physical document (700) selected by the user;
- retrieving from the electronic copy of the document on the server (106), data (903) corresponding to the part (701, 702) of the document (700) selected by the user;
- extracting text data from said data;
- converting this text data to speech (1105) by means of a text-to-speech software;
- optionally, magnifying on the user's display, the text data or the electronic copy corresponding to the selected part (1106) by means of a display magnifying software.

The user workstation (104) is, for example, an Internet appliance, a multimedia Personal Computer (PC), a game console, a cell phone . . . . The touch foil (102) communicates with the user workstation by means of a cable, a wire pair, an infrared link, or a wireless link. In a particular embodiment, the user workstation (104) is connected to a communication network (105), preferably the Internet network and comprises a Web Browser application.

Server

The server (106) is primarily the repository where electronic representations (900) of physical documents (700) are stored. Each electronic representation is associated with a physical document (or publication) by means of the barcode printed on this physical document. The electronic representation of a document includes an exact copy or replica of the original document. This copy includes, for instance, scanned images of pages.

The electronic representation may also include text, text descriptions of graphical elements (such as charts, graphs or illustrations). The server also provides users with additional information such as:

a speech description (205) of the selected document (such as title, authors, general information); and speech instructions related to the selected document (206) (e.g., for informing the user about the position of the barcodes on pages of selected physical document or publication).

Figure 12:
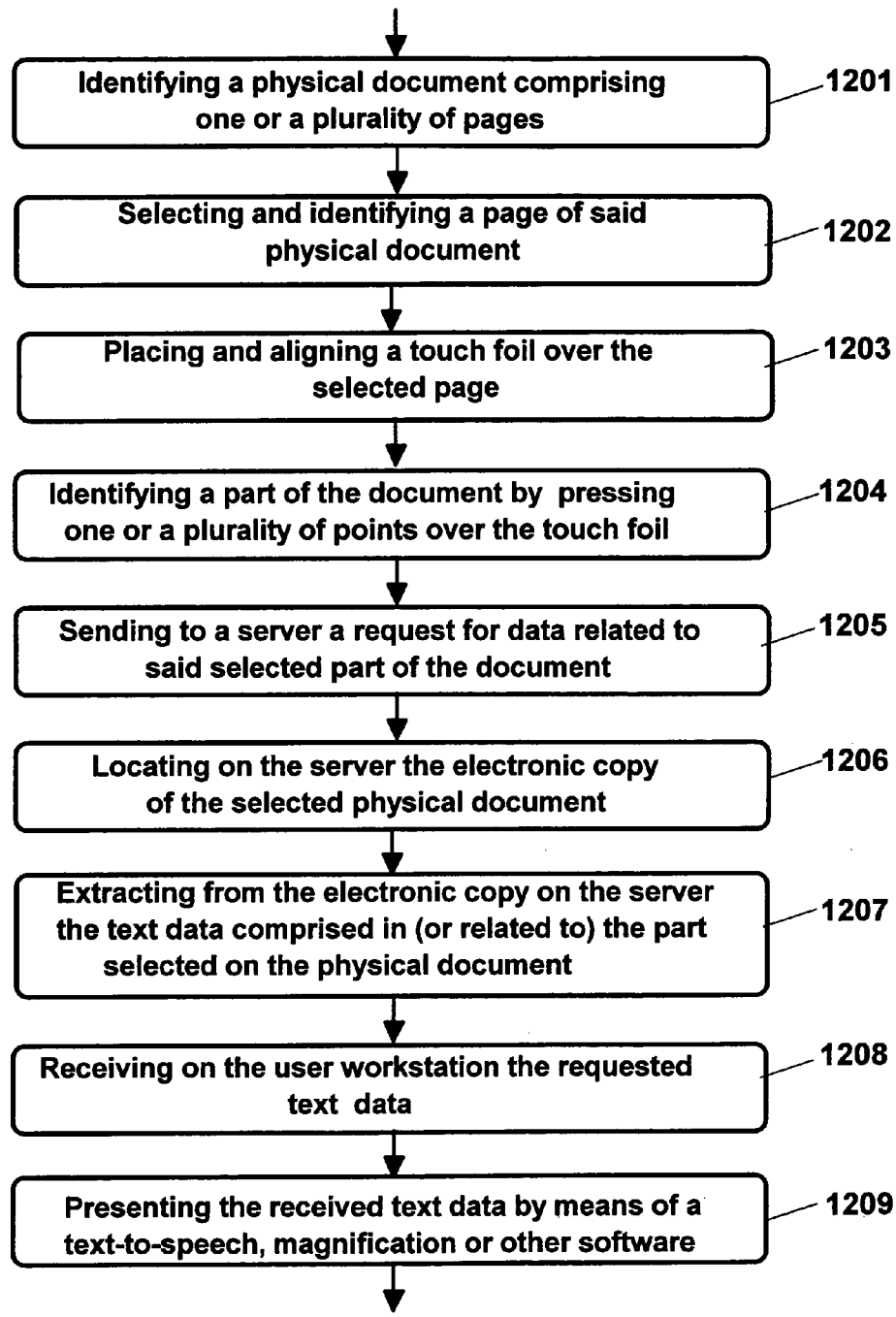
FIG. 12 shows the steps of the method of selecting a part of a physical document and of providing electronic reading and screen magnification of said selected part.

Method for Selecting a Part of a Physical Documents and for Providing an Electronic Reading and Screen Magnification of this Selected Part As shown in FIG. 12, the present invention discloses a system, method and computer program for:

selecting a part of a physical document (preferably a printed publication, like the document shown in FIG. 1 entitled "*Early British Kingdoms*"), simply by touching with a fingertip (or pen) over this physical document;

identifying in an electronic copy (or replica) of the physical document, the part that has been selected by the user;

extracting text data comprised in the selected part, and converting extracted text into electronic speech.

The method comprises the steps of:

(1201) identifying a physical document, said physical document comprising one or a plurality of pages;

(1202) selecting and identifying a page of said physical document, said page comprising one or a plurality of printed items;

determining (1204) the position of a first point pressed (e.g. with a fingertip or pen) on a touch foil placed and aligned (1203) over or under the identified first page, said first point corresponding to the start point of a part selected in said identified document by the user;

if start point and end point of the selected part are on the same page:

determining (1204) the position of a second point pressed (e.g. with a fingertip or pen) on the touch foil placed and aligned (1203) over or under the identified page of said document, said second point corresponding to the end point of said selected part;

if start point and end point are not on the same page:

identifying a second page selected by the user in said physical document, preferably by reading, by means of a barcode reader, a page identifier printed on said second page at a predefined position;

determining (1204) the position of a second point pressed (e.g. with a fingertip or pen) on the touch foil placed and aligned (1203) over or under the identified second page of said document, said second point corresponding to the end point of said selected part;

(1205) sending to a given server a request for the selected document part, said request comprising an identification of:

the physical document, the page(s), and the selected part of the document;

(1206) locating on the server an electronic copy (or replica) of the selected physical document;

(1207) extracting text data related to the part selected on the physical document;

(1208) receiving on the user workstation, the requested text data;

(1209) reading to the user, the received text data using a text-to-speech software on the user workstation.

Figure 2:
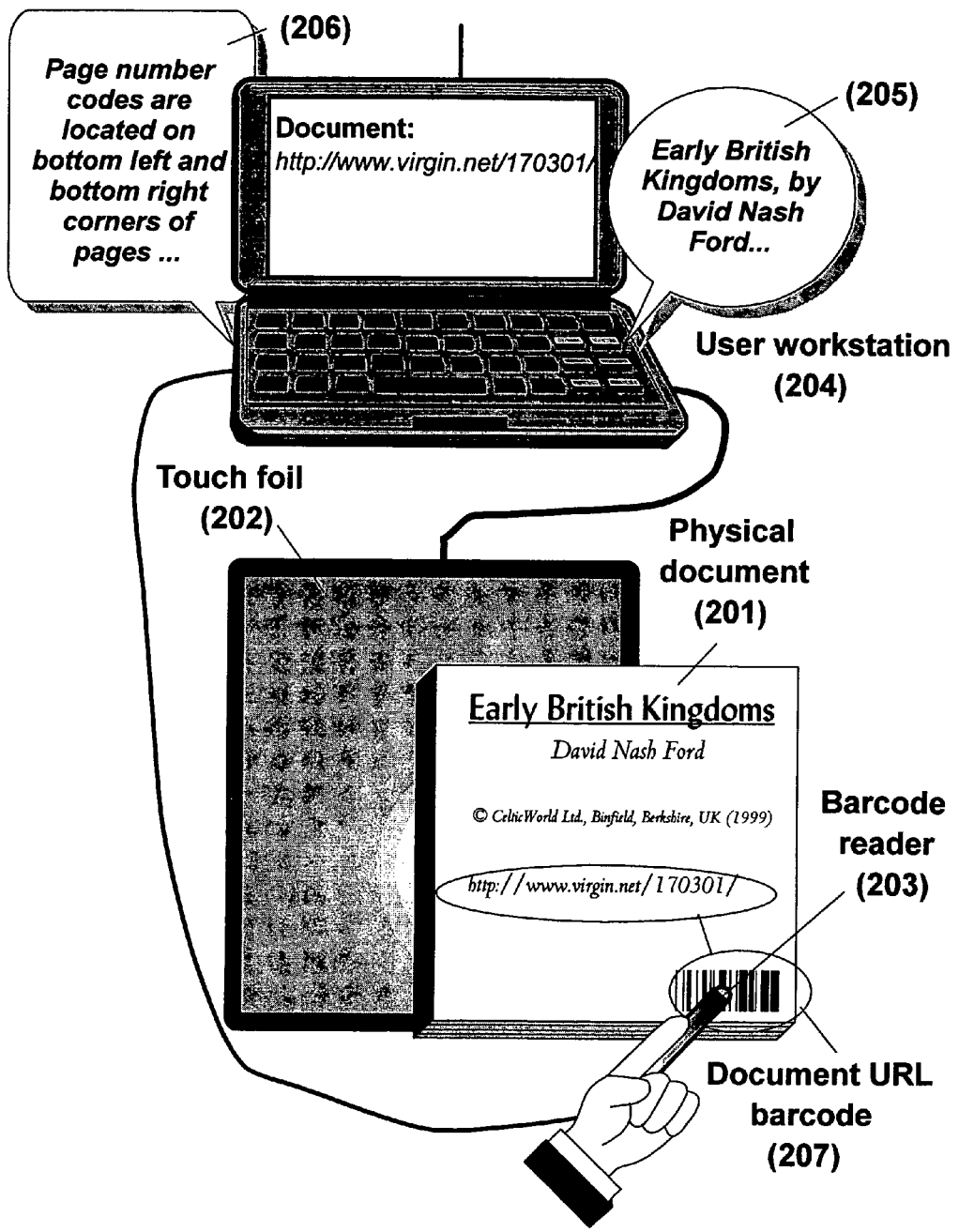
FIG. 2 shows how, according to the present invention, a user, using a barcode reader, reads the address (e.g., URL Uniform Resource Locator) of a document encoded on a bar code printed on this document (e.g., at the bottom right corner of the cover) and how information related to this document (e.g., title, author, etc.) can be retrieved from a server and read to the user by means of an electronic reading system.

FIG. 2 shows how the user selects a physical document (or publication) (201) (e.g., printed book entitled "*Early British Kingdoms*"). By means of any user interface (keyboard, mouse, voice recognition software and microphone) or any other reading means (e.g., barcode reader), the user enters a code or name (207) for identifying the document. In the preferred embodiment shown in FIG. 2, the user reads by means of a barcode reader (203) a bar code (207) with the address on the Web (e.g.: the URL http://www.virgin.net/170301/) of the electronic copy (or replica with the same identical format) of the selected physical document (201). The bar code (207), used to identify the document, must be printed or attached at a predefined reserved place on the physical document (e.g., on the front cover, back cover or first page).

The bar code gives access, on the server (106), to information related to the selected physical document, such as:

the title (e.g., "*Early British Kingdoms*"), the author's name (e.g., "David Nash Ford of Binfield, Berkshire, UK"), the date of the publication (e.g., "28 January 1999"), the ISBN (International Standard Book Number) (e.g., "84-344-0856-2"), etc.

This information about the selected physical document is transmitted from the server (106) to the user workstation (204) as a text file. This text file is then converted to electronic voice (205) by means of a text-to-speech software operating on the user workstation.

The user workstation can also receive from the server (106) operational instructions (206) for locating page numbers barcodes on the pages of the selected physical document or publication (e.g., "Page number codes are located on bottom left and bottom right corners of pages"). These operational instructions are transmitted to the user by means of the text-to-speech software operating on the user workstation.

FIG. 3 shows how a user opens a physical document (300) at the page where a bookmark has been inserted (e.g., on "Page 16"). This figure also shows how on each page of the document (e.g., "Page 16", "Page 17"), a bar code (301), (302) with a page number, is printed on a predefined and fixed position, already known by the user.

Figure 4:
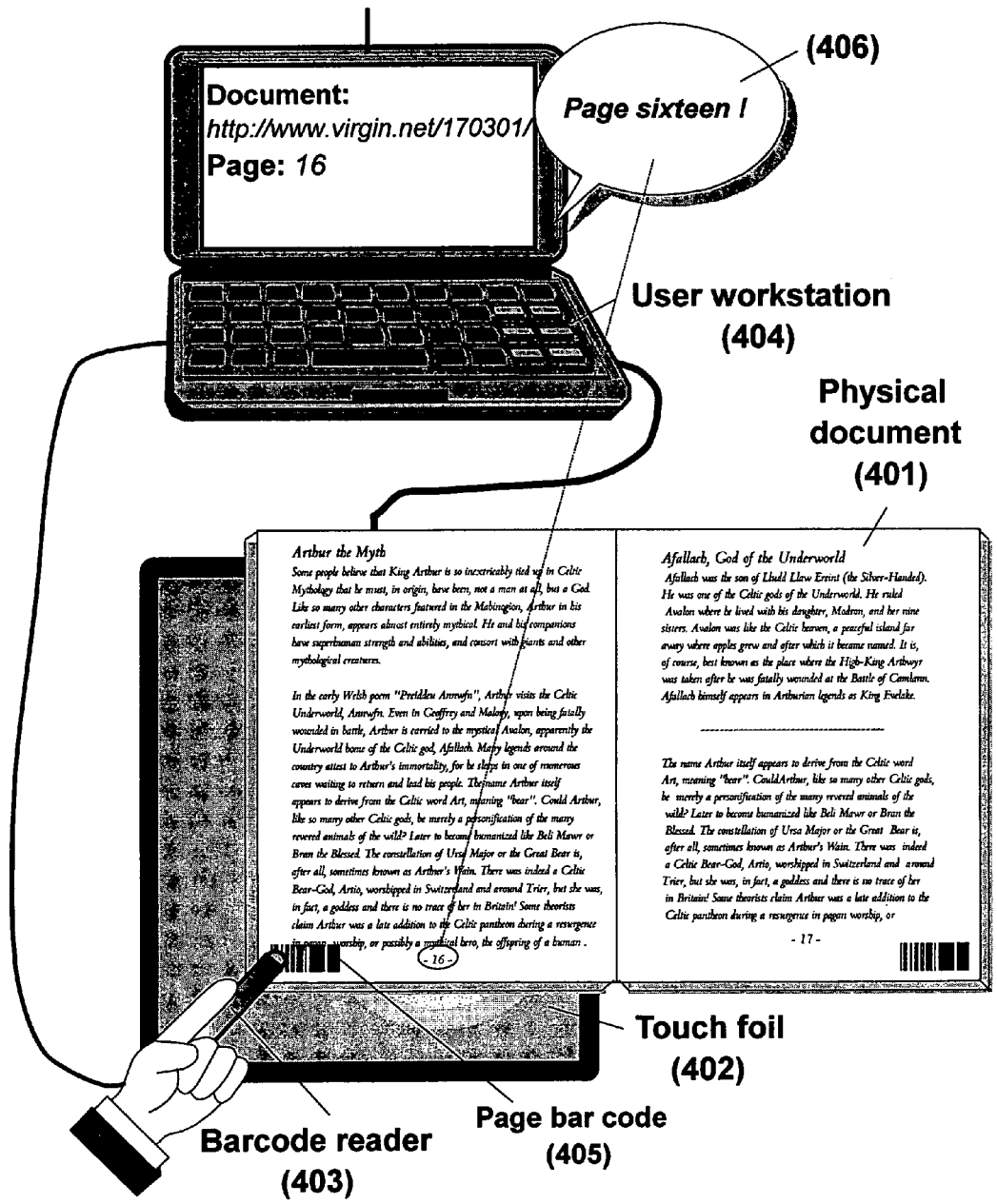
FIG. 4 shows how, according to the present invention, a user using a barcode reader, can read a page number encoded on a bar code printed at a predefined position on a selected page and how the system decodes and audibly informs the user of the selected page number.

FIG. 4 shows how a user selects a page of physical document (401) and how the number of the selected page is identified by scanning by means of barcode reader (403), the bar code (405) encoding the page number. After decoding the scanned bar code, the user workstation (404) informs the user (406) by means of an electronic voice, of the selected page number (e.g., "Page sixteen!").

Alternate embodiments for identifying pages of a document exists and can be used with the present invention. An example is given by a document having page numbers printed as text. It is possible to identify a page of the document by scanning on the page the place where the page number is printed. A scanning device can be integrated with the barcode scanner described previously. The scanning device can also be used separately like the Quicklink Pen Personal Scanner described in the specifications of the present application.

Figure 5:
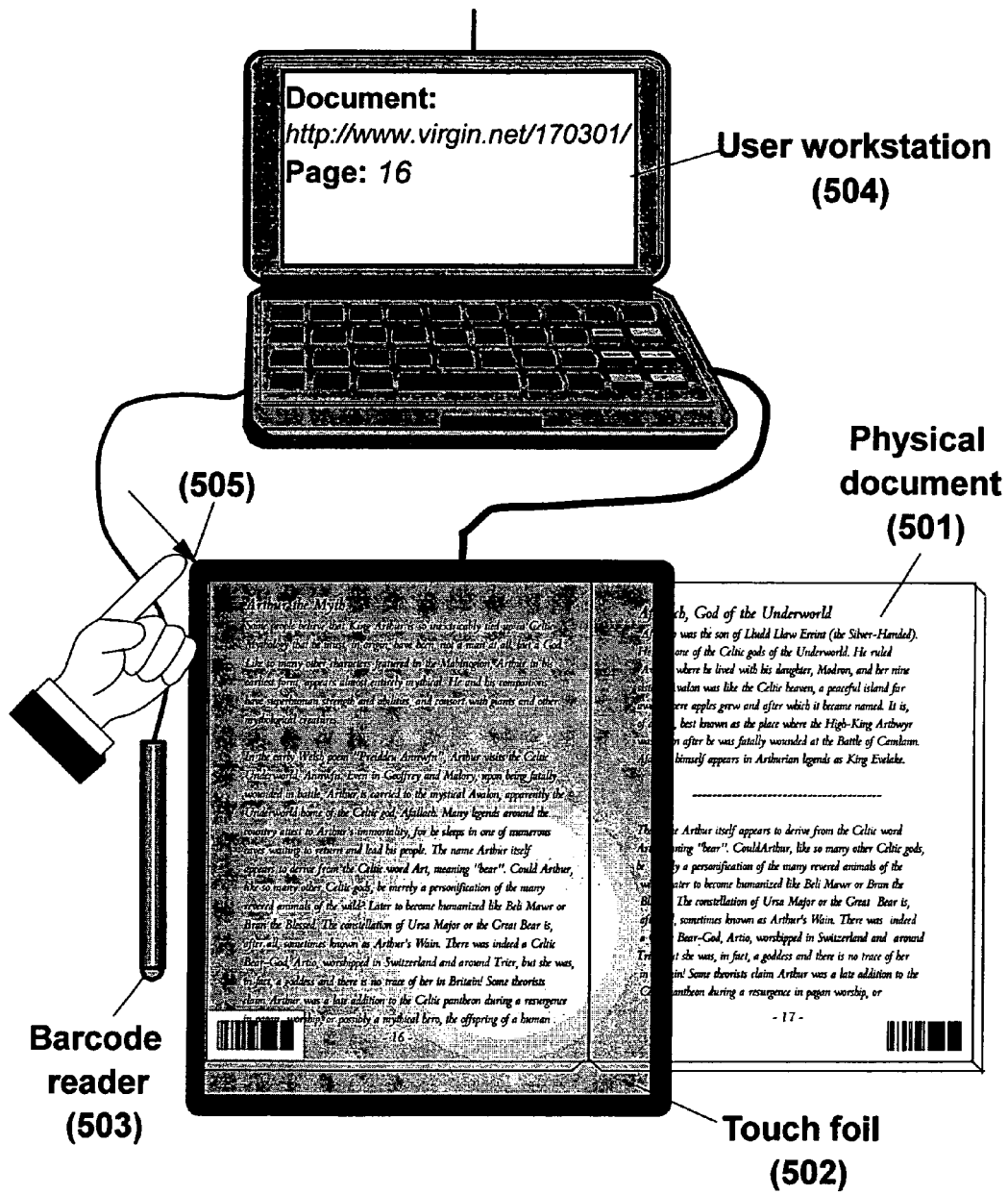
FIG. 5 shows how a touch foil is placed aligned over a selected page of a physical document according to the present invention.

FIG. 5 shows how a user places a touch foil (502) over a page of a physical document, aligning the borders of the touch foil and the document using some conventional means (505) (e.g., by adjusting the upper left corner of the touch foil with the upper left corner of the page).

Figure 6:
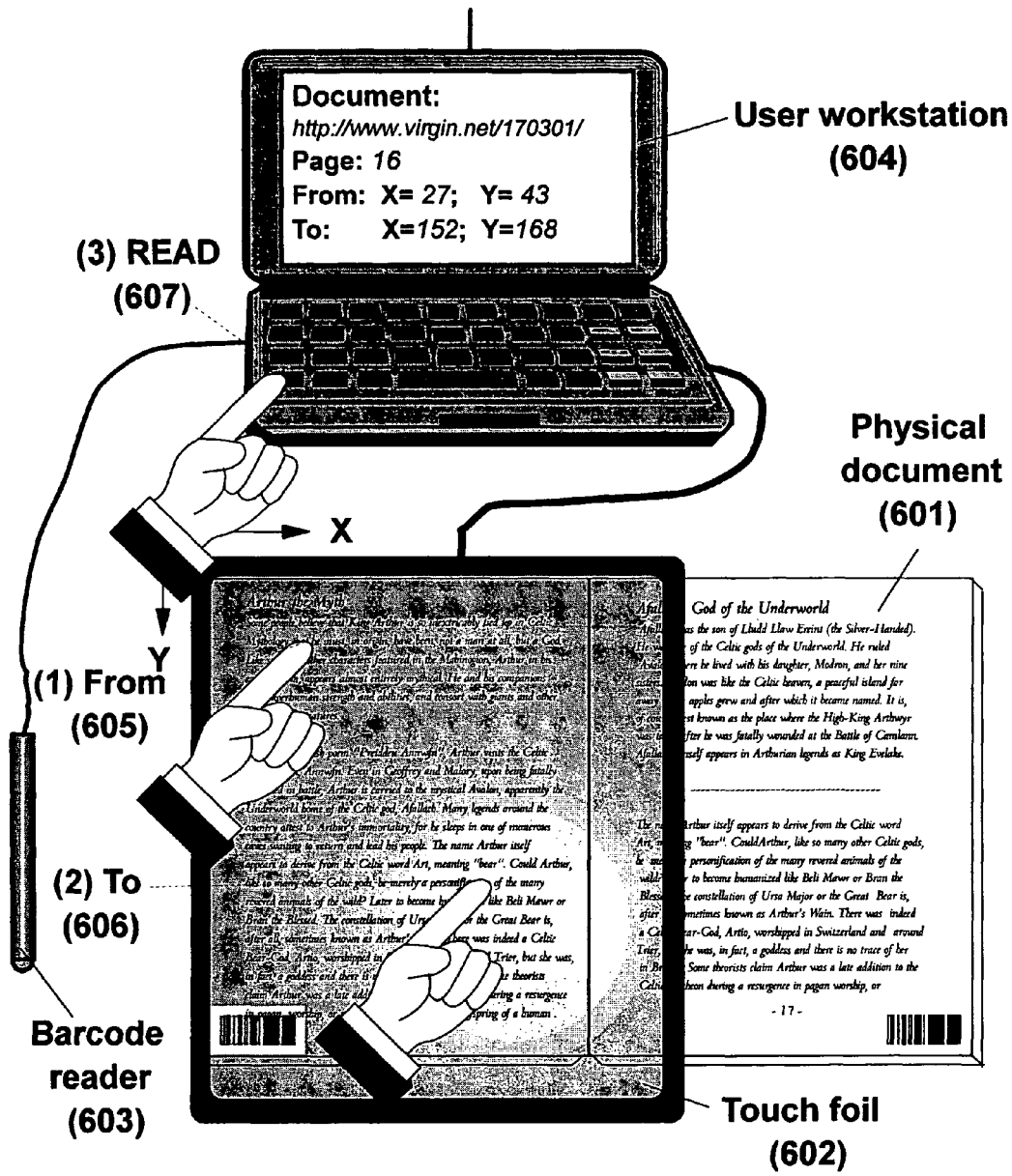
FIG. 6 shows how a user selects a part of the physical document by pressing a first point and a second point on a touch foil placed aligned over a selected page.

FIG. 6 shows how, according to a particular embodiment of the present invention, it is possible to define a part of a physical document (601). The user presses (e.g., with a fingertip or pen) (1) on a first point (605) and then (2) on a second point (606) over the touch foil (602) placed aligned over the selected page (e.g., over "Page 16" of the publication entitled "*Early British Kingdoms*"). When the user has finished to press the points defining the selected part that he desires to hear and that must be electronically read, she/he (3) then presses on the keyboard of the user workstation (604) a reserved READ key (607), informing the system to initiate the task of locating and reading the selected document part. Coordinates of the points (605), (606) pressed by the user on the touch foil (602) are transmitted from the touch foil to the user workstation (604).

The selection of a part of a physical document using a touch foil, can be done according to various forms. For example, in a particular embodiment of the invention, if the user touches a single point on the touch foil and then presses the READ key, this operation is equivalent to a command for reading the full document from this point (possibly until the user presses a STOP READ reserved key on the user workstation keyboard). Also, if the user selects a first page and indicates a first point on this first page, and then selects a second page and indicates a second point on this second page, and then presses the READ key, this operation is equivalent to a command for reading the document from the first point selected on the first page to the second point selected on the second page. It is now apparent that other arrangements can be implemented by those skilled in the art for correlating a plurality of points selected by a user with a part of a physical document.

Figure 7:
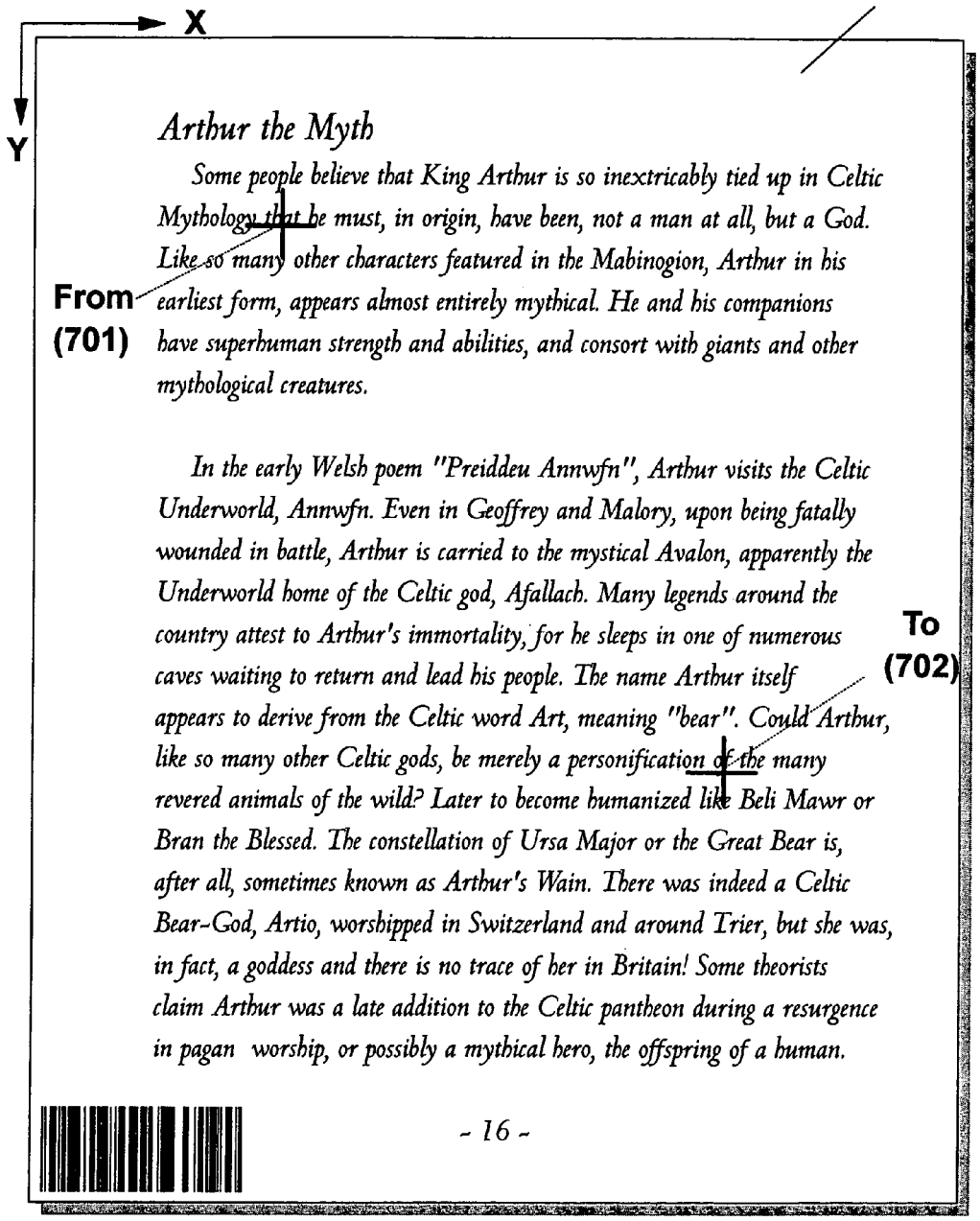
FIG. 7 shows the start point and the end point of the part of the physical document selected by the user, said start point and end point corresponding to the two points over the touch foil previously pressed by the user.

FIG. 7 shows in detail two points (701), (702) on a page of a physical document (700). These two points correspond to the points (605), (606) pressed by the user on the touch foil (602).

Figure 8:
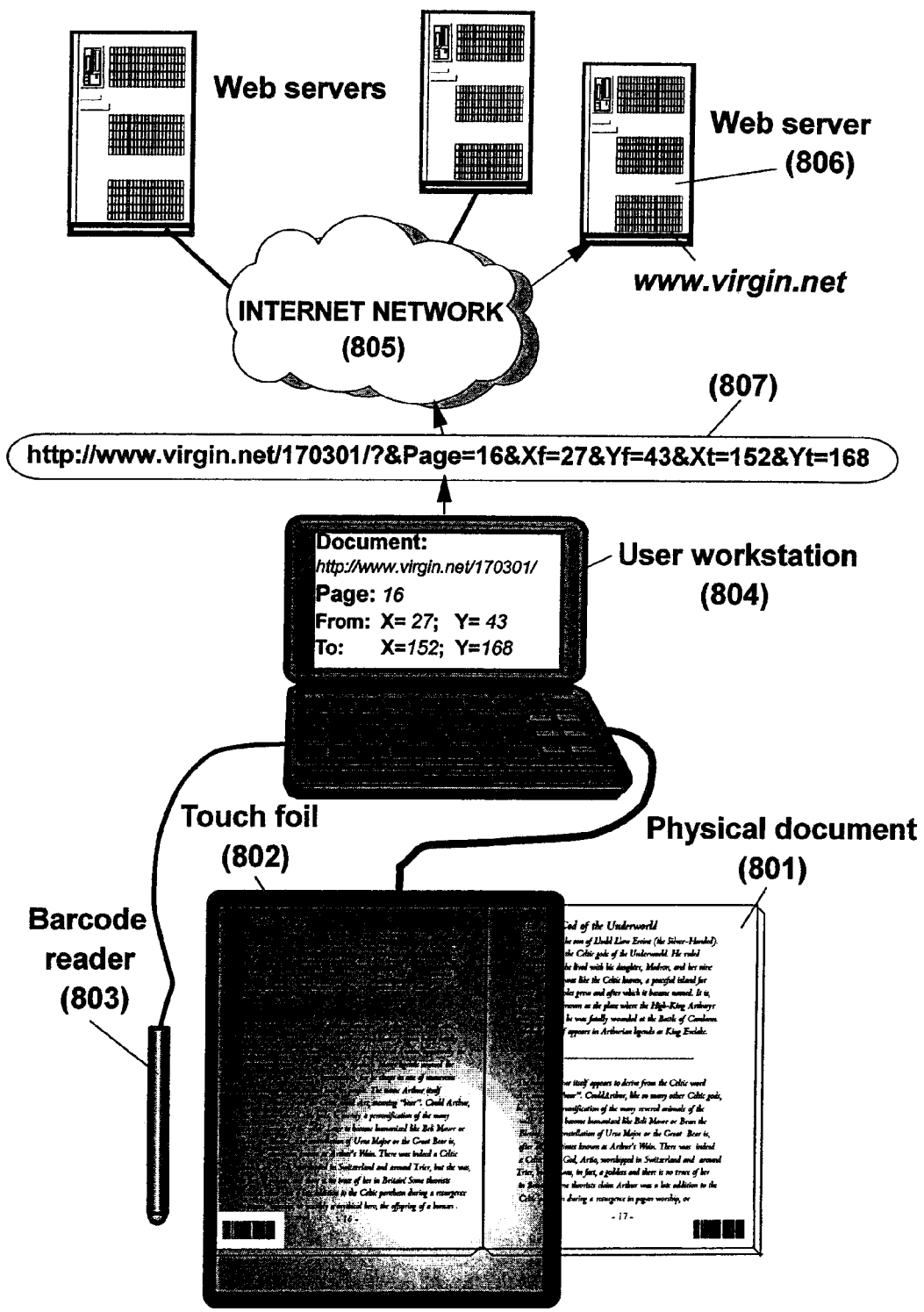
FIG. 8 shows how, according to the present invention, a request for retrieving information related to a part of a document is sent to a server.

FIG. 8 shows how the user workstation (804) sends a request (807) related to a part (701), (702) of a physical document (700) to a server (806). The request comprises an identification of:
 the physical document,
 the selected page, and
 the coordinates of the part selected by the user.
 In the example illustrated in FIG. 8, the HTTP request:
 http://www.virgin.net/170301/?&Page=16&Xf= 27&Yf=43&Xt=152&Yt=168
specifies:
 the URL of the physical document (e.g., http://www.virgin.net/170301/),
 the page number (e.g., "Page=16"), and
 the coordinates of the part selected by the user (e.g., From: Xf=27, Yf=43; To: Xt=152, Yt=168).
 In the example illustrated in FIG. 8, when the server (806) (e.g., "www.virgin.net") receives the HTTP request, this request is parsed to find the physical document reference number (e.g., "170301"). This physical document reference number (or code) is then used to search on the server for the electronic copy (e.g., "170301.PDF") of the physical document (same format and same content). The HTTP request is also parsed to find the page of the physical document (e.g., "Page=16") selected by the user and the coordinates specifying the selected part of the physical document (e.g., From: Xf=27, Yf=43; To: Xt=152, Yt=168) on the server.

Figure 9:
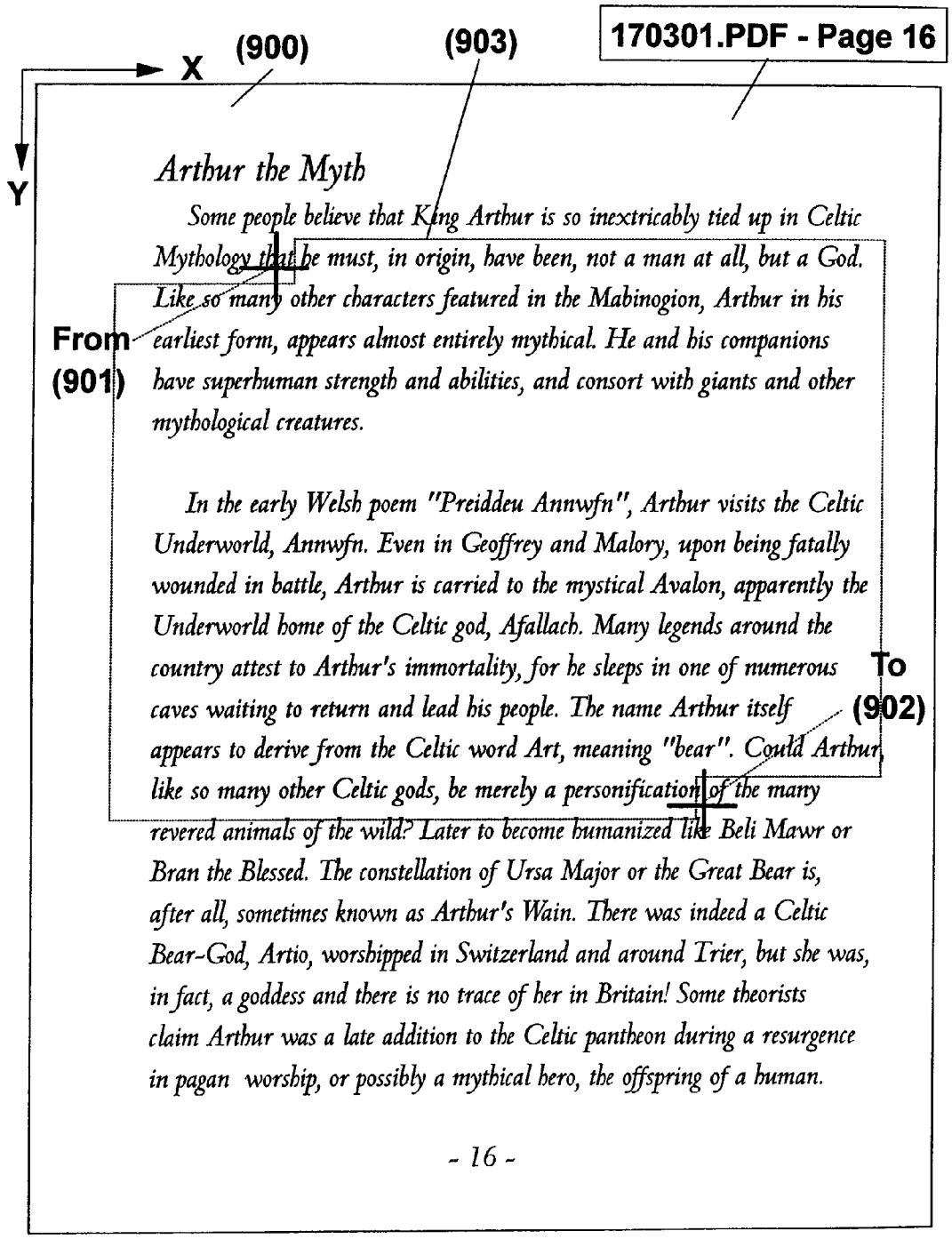
FIG. 9 shows how, according to the present invention, data related to the part selected by the user on the physical document is extracted (in bold) from the electronic copy of the document stored on the Server.

FIG. 9 illustrate how, in a particular embodiment of the invention, the server (806) uses the information comprised in the HTTP request (807):
 document reference number,
 page number, and
 coordinates of points defining the part of the document selected by the user, to locate and extract from the electronic copy (e.g., "170301.PDF") replica of the physical document (801), text data (903) (in bold) corresponding to the part of physical document (701), (702) selected by the user. The extracted text data is formatted by the server in the form of a text file (e.g., "SELECTION. TXT") and is transmitted as reply to the request (807) previously received from user workstation (804).

It is important to note that different methods can be used to determine, from the coordinates of the points selected (701), (702) on the touch foil, the text data (903) that must be must be extracted from the electronic copy (from point 901 to point 902). In the example illustrated in FIG. 9, incomplete words are excluded from the head and from the tail of the text string comprised in the selected part of the physical document.

The server can also receive from the user workstation a HTTP request (such as "&format=magnifyOriginal") to view a magnified image of a part of the original document. The server sends back a reply including an image of the selected part of the same format and appearance than the original document. This image is magnified on the display of the user workstation.

Figure 10:
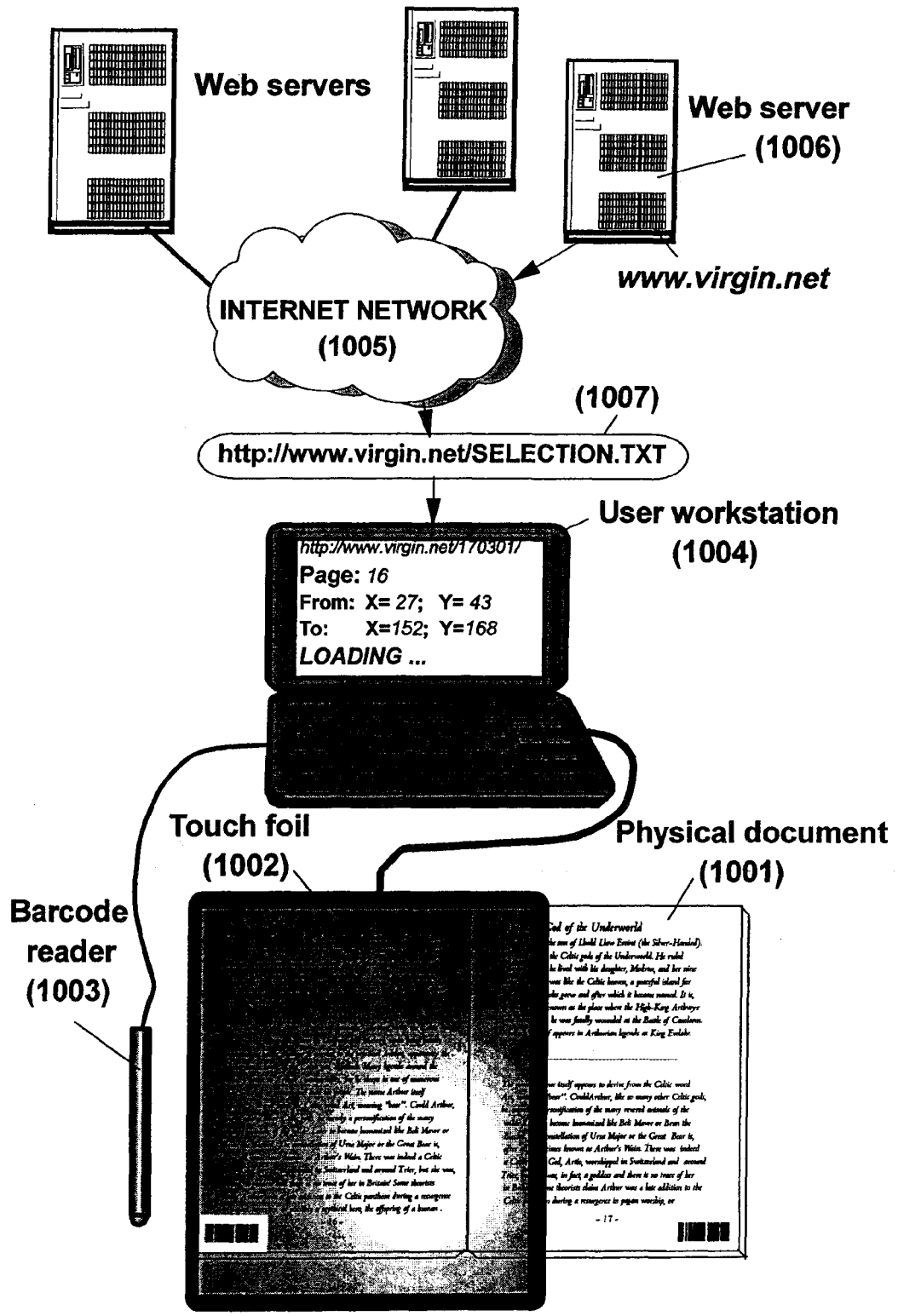
FIG. 10 shows how, according to the present invention, the text corresponding to the selected part of the physical document is downloaded from the server to the user workstation.

The information returned by the server (806) in reply to the request (807) received from user workstation (804) can be different than the exact transcription (as a text file) of the data printed on the physical document. In fact, nothing prevents the server (806), to reply with any kind of multimedia information (e.g., a combination of a long text description with music or songs). This multimedia information can be linked (or even hyperlinked) with different parts of the physical document that the user can select. Therefore, the invention is not limited to a mechanism for reading (i.e., for speaking by means of text-to-speech transcription) text printed on a physical document to a blind user, but the invention is also directed to a mechanism for accessing from a physical document, all kinds of multimedia information or services available on the Web FIG. 10 shows how, in reply to request of a user for accessing information from a selected part (701), (702) of a physical document, text data (903) extracted from (or associated with) the selected part on the electronic copy of the document (900), is downloaded (1007) as a text file (e.g., "SELECTION.TXT") from the server (1006) to the user workstation (1004).

Figure 11:
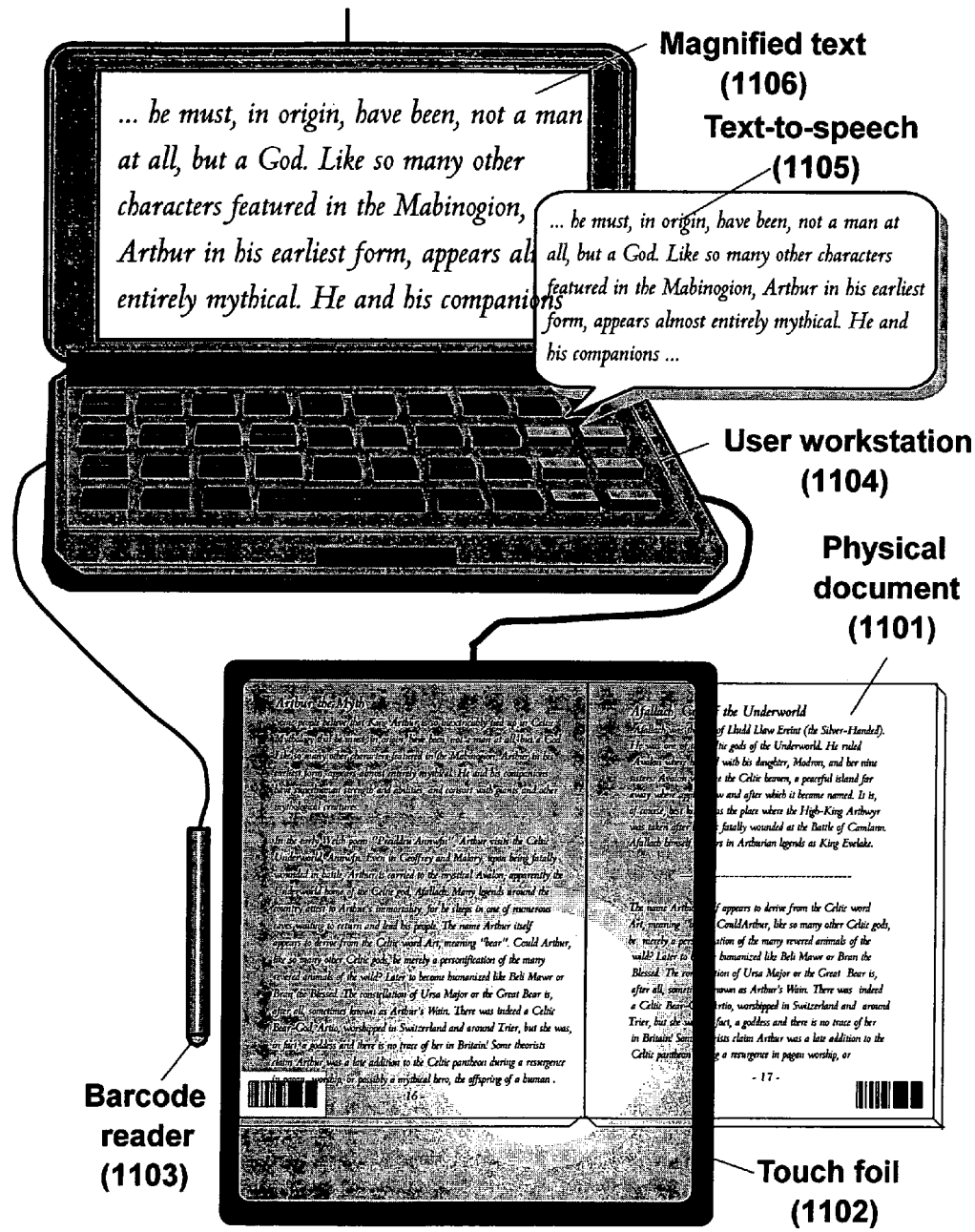
FIG. 11 shows how, according with the present invention, the received text file can be converted to an audio file or can be magnified.

FIG. 11 shows how the text file (e.g., "SELECTION. TXT"), once received by the user workstation (1104), is converted into an audio file (.aiff, .wav, .au file) by means of a text-to-speech software and is played (1105) to the user. This figure shows also, how the received text is magnified (1106) on the user workstation display by means of a screen magnifying software.

What has been described is merely illustrative of the application of the principles of the present invention. Other arrangements and methods can be implemented by those skilled in the art without departing from the spirit and scope of the present invention.

What is claimed is:

1. A method for use in a user system, for accessing information related to a physical document, said method comprising:
   identifying an existing physical document;
   after said identifying the existing physical document, identifying and locating an electronic copy of said identified existing physical document, wherein the electronic copy of the document is an exact replica of the physical document;
   identifying one page or a plurality of pages of said physical document;
   identifying a selected part of the physical document using the position of points on said identified one page or a plurality of pages;
   in response to said identifying the selected part of the physical document using the position of points on said identified one page or a plurality of pages, retrieving, from the electronic copy of the physical document, data related to the selected part of the physical document;
   presenting said retrieved data visually to a visually impaired person or orally to a blind person on the user system, wherein said presenting said retrieved data visually is configured to enable the visually impaired person to see said retrieved data, and wherein said presenting said retrieved data orally is configured to enable the blind person to hear said retrieved data.

2. The method of claim 1, wherein said identifying a part of the identified physical document using the position of points on said identified one page or a plurality of pages further comprises pressing said points on a touch foil successively placed and aligned over or under said identified one page or a plurality of pages.

3. The method of claim 2, wherein said pressing comprises pressing said points with a fingertip or a pen on a touch foil.

4. The method of claim 1, wherein said physical document and said one page or a plurality of pages in said physical document are selected by a user.

5. The method of claim 1, wherein the selected part of the physical document comprises a start point on a first page of the physical document and an end point on a second page of the physical document, wherein the first and second pages are different pages of the physical document, and wherein said identifying one page or a plurality of pages of said physical document and identifying a selected part of the physical document using the position of points pressed on a touch foil successively placed and aligned over or under said identified one page or a plurality of pages consists of:
   identifying the first page in said physical document;
   determining the position of a first point pressed on the touch foil placed and aligned over or under the identified first page, said first point being the start point;
   identifying the second page in said physical document;
   determining the position of a second point pressed on the touch foil placed and aligned over or under the identified second page of said document, said second point being the end point;
   identifying the selected part of the physical document using the position of the start point and the end point.

6. The method of claim 1, wherein said presenting comprises presenting said retrieved data orally to the blind person on the user system, and wherein said presenting said retrieved data orally comprises:
   extracting text data from said data;
   converting said text data into data that can be audibly read.

7. The method of claim 6, wherein said converting said text data into data that can be electronically read comprises:
   audibly reading, to the blind person on the user system, said text data by means of a text-to-speech system.

8. The method of claim 1, wherein said presenting comprises presenting said retrieved data visually to the visually impaired person on the user system, and wherein said presenting said retrieved data visually comprises:
   magnifying the retrieved data on a screen such that the magnified retrieved data can be visually read by the visually impaired person.

9. The method of claim 8, wherein said magnifying the retrieved data on the screen comprises:
   magnifying on the screen the electronic copy of the selected part of the physical document.

10. The method of claim 1, wherein said presenting comprises presenting said retrieved data visually to the visually impaired person on the user system, and wherein said presenting the retrieved data visually comprises:
    enhancing on a screen the electronic copy of the selected part of the physical document to match a preferred reading view of the visually impaired person.

11. The method of claim 1, wherein said identifying the physical document comprises:
    reading, by means of a barcode reader, a document identifier printed on said physical document at a predefined position.

12. The method of claim 1, wherein said identifying one page or a plurality of pages consists of said identifying one page, and wherein said identifying one page in said physical document comprises:
    reading, by means of a barcode reader, a page identifier printed on said one page at a predefined position.

13. The method of claim 1, wherein said presenting comprises presenting said retrieved data orally to the blind person on the user system, and wherein said retrieving, from the electronic copy of the document, data related to the selected part of the physical document comprises:
    identifying and locating information and services associated with the selected part of the physical document;
    retrieving said information and services; and
    audibly playing said information and services on the user system.

14. The method of claim 13, wherein said information associated with the selected part of the physical document comprises a description of graphical data pertaining to an image and related to the selected part of the physical document, and wherein said audibly playing comprises audibly playing said description of said graphical data to the blind person on the user system.

15. The method of claim 1, wherein said presenting comprises presenting said retrieved data orally to the blind person on the user system, and wherein said identifying and locating an electronic copy of the identified document comprises:
    identifying and locating information associated with the physical document;
    retrieving said information; and
    audibly playing said information to the blind person on the user system.

16. The method of claim 15,
wherein the information associated with the physical document comprises speech instructions related to the physical document;
wherein the speech instructions comprise speech instructions for locating positions of bar codes on pages of the physical document;
wherein said audibly playing comprises audibly playing, to the blind person on the user system, said speech instructions for locating said positions of bar codes on pages of the physical document;
wherein a first bar code of said bar codes enables access to a title of the physical document, a name of an author of the physical document, a date of publication of the physical document, and an International Standard Book Number (ISBN) of the physical document; and
wherein said title, said name, said date, and said ISBN are stored on a server connected to the user system.

17. The method of claim 1, wherein said user system is connected to a communication network comprising plurality of servers, and wherein the electronic copy of the physical document is located on one server of said plurality of servers.

18. The method of claim 1, wherein the electronic copy of the physical document is located on the user system.

19. The method of claim 1, wherein said user system is connected to a communication network comprising a plurality of servers, wherein information and services associated with said physical document are located on each server of said plurality of servers, wherein the information comprises said data related to the selected part of the physical document, and wherein the method further comprises:
transmitting to a given server of the plurality of servers a document identification code that identifies the electronic copy of the physical document and at least one page identification code that identifies the one page or a plurality of pages of the physical document.

20. The method of claim 1, wherein the electronic copy of the physical document and information and services associated with said physical document are located on the user system.

21. The method of claim 1, wherein said physical document comprises Braille indications.

22. The method of claim 1, wherein the method does not comprise using an electronic reading machine based on a page scanner, and wherein the method does not comprise using optical character recognition (OCR).

23. A user system comprising:
a computer; and
a non-transitory storage device containing instructions which, upon being executed by the computer, carry out the method of claim 1.

24. A system comprising:
said user system of claim 23 connected to a communication network;
a touch foil to be placed over or under a page of a physical document for:
detecting a pressure exercised over one or a plurality of point of its surface; and
determining the coordinates of said one or plurality of points; and
a connection between said touch foil and the user system.

25. The system of claim 24, said system further comprising a bar code reader connected to said user system for reading bar codes on the physical document.

26. A non-transitory storage device comprising instructions which, upon being executed by a computer, carry out the method of claim 1.

* * * * *